(12) United States Patent
Sullivan et al.

(10) Patent No.: US 6,309,314 B1
(45) Date of Patent: *Oct. 30, 2001

(54) GOLF BALL WITH VERY THICK COVER

(75) Inventors: Michael J. Sullivan, Chicopee; Mark L. Binette, Ludlow, both of MA (US)

(73) Assignee: Spalding Sports Worldwide, Inc., Chicopee, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/677,217

(22) Filed: Oct. 2, 2000

Related U.S. Application Data

(63) Continuation of application No. 09/186,585, filed on Nov. 5, 1998, now Pat. No. 6,126,559, which is a continuation of application No. 08/743,579, filed on Nov. 4, 1996, now Pat. No. 5,883,553, which is a continuation-in-part of application No. 08/240,259, filed on May 10, 1994, now abandoned, which is a continuation-in-part of application No. 08/054,406, filed on Apr. 28, 1993, now Pat. No. 5,368,304.

(51) Int. Cl.$^7$ ................................................. A63B 37/12
(52) U.S. Cl. ............................................. 473/378; 473/377
(58) Field of Search ............................... 473/378, 377, 473/373, 374

(56) References Cited

U.S. PATENT DOCUMENTS

| | | |
|---|---|---|
| 3,784,209 | 1/1974 | Berman . |
| 4,123,061 | 10/1978 | Dusbiber . |
| 4,141,559 | 2/1979 | Melven et al. . |
| 4,234,184 | 11/1980 | Deleens et al. . |
| 4,274,637 | 6/1981 | Molitor . |
| 4,483,537 | 11/1984 | Hanada et al. . |
| 4,546,980 | 10/1985 | Gendreau et al. . |
| 4,674,751 | 6/1987 | Molitor et al. . |
| 4,715,607 | 12/1987 | Llort et al. . |
| 4,726,590 | 2/1988 | Molitor . |
| 4,770,422 | 9/1988 | Isaac . |
| 4,852,884 | 8/1989 | Sullivan . |
| 4,884,814 | 12/1989 | Sullivan . |
| 4,968,038 | 11/1990 | Yamada . |
| 4,986,545 | 1/1991 | Sullivan . |
| 5,019,320 | 5/1991 | Hasegawa et al. . |
| 5,072,944 | 12/1991 | Nakahara et al. . |
| 5,098,105 | 3/1992 | Sullivan . |
| 5,120,791 | 6/1992 | Sullivan . |
| 5,187,013 | 2/1993 | Sullivan . |
| 5,209,485 | 5/1993 | Nesbitt et al. . |
| 5,253,871 | 10/1993 | Viollaz . |
| 5,314,187 | 5/1994 | Proudfit . |
| 5,328,959 | 7/1994 | Sullivan . |
| 5,330,837 | 7/1994 | Sullivan . |
| 5,368,304 | 11/1994 | Sullivan et al. . |
| 5,433,447 | 7/1995 | Pocklington . |
| 5,439,227 | 8/1995 | Egashira et al. . |
| 6,126,559 | * 10/2000 | Sullivan et al. ............. 473/378 |

* cited by examiner

Primary Examiner—Mark S. Graham
Assistant Examiner—Raeann Gorden

(57) ABSTRACT

Disclosed herein is a golf ball having a solid core with a coefficient of restitution of at least 0.650 and a cover with a thickness of at least 3.6 mm (0.142 inches) and a Shore D hardness of at least 60. The combination of a soft core with a thick, hard cover results in a ball having better distance than conventional golf balls having a comparable coefficient of restitution.

39 Claims, 1 Drawing Sheet ation Ser. No. 09/186,585, U.S. Pat. No. 6,126,559 filed Nov. 5, 1998, which is a continuation of U.S. application Ser. No. 08/743, 579 filed Nov. 4, 1996, now U.S. Pat. No. 5,883,553, which is a continuation-in-part of U.S. application Ser. No. 08/240, 259 filed May 10, 1994, now abandoned, which is a continuation-in-part of U.S. application Ser. No. 08/054, 406, filed Apr. 28, 1993 (U.S. Pat. No. 5,368,304).

GOLF BALL WITH VERY THICK COVER

This application is a continuation of U.S. application Ser. No. 09/186,585, U.S. Pat. No. 6,126,559 filed Nov. 5, 1998, which is a continuation of U.S. application Ser. No. 08/743, 579 filed Nov. 4, 1996, now U.S. Pat. No. 5,883,553, which is a continuation-in-part of U.S. application Ser. No. 08/240, 259 filed May 10, 1994, now abandoned, which is a continuation-in-part of U.S. application Ser. No. 08/054, 406, filed Apr. 28, 1993 (U.S. Pat. No. 5,368,304).

The present invention relates to golf balls, and more particularly to golf balls having thick covers.

Spin rate is an important golf ball characteristic for both the skilled and unskilled golfer. High spin rates allow for the more skilled golfer, such as PGA professionals and low handicap players, to maximize control of the golf ball. This is particularly beneficial to the more skilled golfer when hitting an approach shot to a green. The ability to intentionally produce "back spin", thereby stopping the ball quickly on the green, and/or "side spin" to draw or fade the ball, substantially improves the golfer's control over the ball. Thus, the more skilled golfer generally prefers a golf ball exhibiting high spin rate properties.

However, a high spin golf ball is not desired by all golfers, particularly high handicap players who cannot intentionally control the spin of the ball. In this regard, less skilled golfers, have, among others, two substantial obstacles to improving their game: slicing and hooking. When a club head meets a ball, an unintentional side spin is often imparted which sends the ball off its intended course. The side spin reduces one's control over the ball as well as the distance the ball will travel. As a result, unwanted strokes are added to the game.

Consequently, while the more skilled golfer desires a high spin golf ball, a more efficient ball for the less skilled player is a golf ball that exhibits low spin properties. The low spin ball reduces slicing and hooking and enhances roll distance for the amateur golfer. It would be useful to develop a low spin golf ball with excellent distance for use by high handicap players.

SUMMARY OF THE INVENTION

An object of the invention is to provide a golf ball with a low spin rate.

Another object of the invention is to provide a golf ball having better distance than conventional golf balls having a comparable coefficient of restitution.

Another object of the invention is to provide a golf ball having a low spin rate and excellent distance on full shots, combined with a soft feel when the ball is used for chipping and putting.

Yet another object of the invention is to provide a method of making a golf ball of the type described above.

The invention in a preferred form is a golf ball comprising a solid core having a coefficient of restitution (COR) of at least 0.650, and a cover having a thickness of at least 3.6 mm (when measured at a land area of the cover) and a Shore D hardness (measured generally in accordance with A.S.T.M. D-2240, but measured on the land area of a curved surface of a molded ball) of at least 60, preferably at least 64.

In one embodiment of the invention, the cover includes an inner cover layer and an outer cover layer. The inner and outer cover layers preferably have substantially the same Shore D hardness.

The golf ball preferably has a cover thickness of at least 3.8 mm, even more preferably at least 4.0 mm, and most preferably at least 4.5 mm when measured at a land area of the cover. The core preferably has a COR of at least 0.700 and more preferably at least 0.750. The difference between the coefficient of restitution of the ball and the coefficient of restitution of the core is at least 0.025. The core preferably has a PGA compression of about 85 or less.

Another preferred form of the invention is a method of making a golf ball comprising forming a core having a COR of at least 0.650 and forming a cover over the core, the cover having a thickness of at least 3.6 mm (when measured at a land area of the cover) and a Shore D hardness (measured generally in accordance with A.S.T.M. D-2240, but measured on a land area of a curved surface of a molded ball) of at least 60, and preferably at least 64. The core preferably has a PGA compression of 85 or less.

DETAILED DESCRIPTION OF THE INVENTION

The golf ball of the invention has a solid core having a COR of at least 0.650 in combination with a thick, relatively hard cover.

Figure 1:
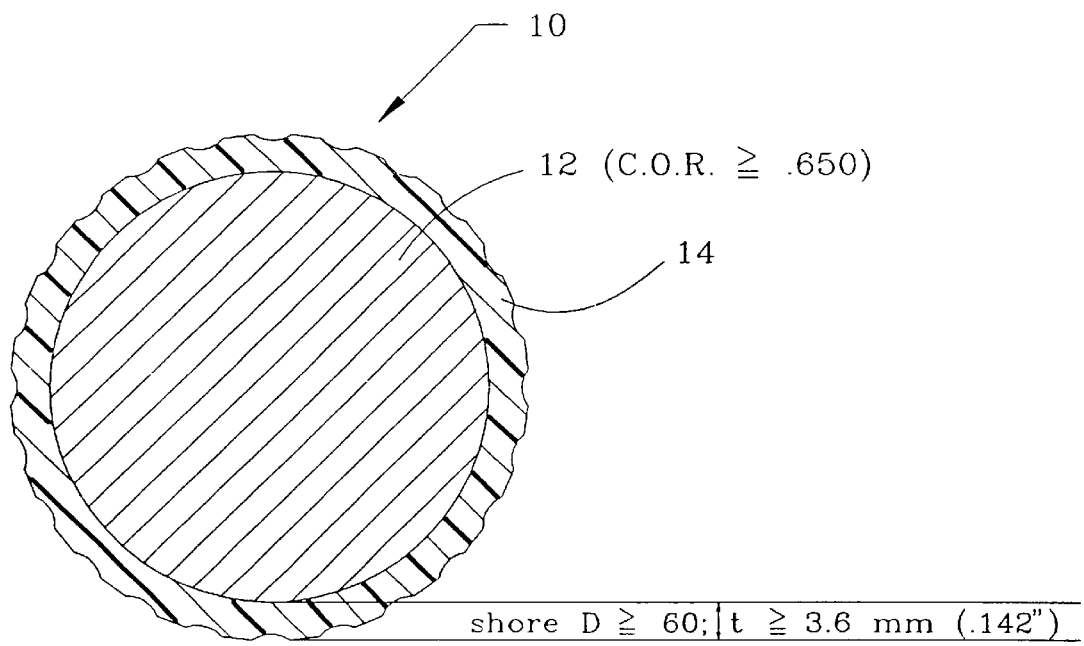
FIG. 1 shows a cross section of a two-piece solid golf ball according to the invention.

Referring to the drawings and particularly to FIG. 1, a first preferred embodiment of a golf ball according to the invention is shown and is designated as 10. The golf ball has a solid or foam core 12. A cover 14 surrounds the core.

In a preferred embodiment, the core 12 is relatively soft, with a PGA compression of about 85 or less, preferably about 20 to 85, and more preferably about 40–60. The cover 14 has a thickness of at least 3.6 mm (0.142 inches). It is particularly preferred that the cover thickness be at least 3.8 mm (0.150 inches). Particularly good results are obtained when the cover has a thickness of at least 4.0 mm (0.157 inches). In certain circumstances, such as when a harder compression and harder feel may be desired, it is optimum to employ a cover having a thickness of at least 4.5 mm (0.177 inches). As used herein, "cover thickness" is the thickness of the cover from the inner diameter of the cover to the outer surface of the cover at a land area.

The golf ball of the invention has a difference between the coefficient of restitution of the ball and the coefficient of restitution of the core of at least 0.025, preferably at least 0.035, and more preferably at least 0.045. The golf balls have an unexpectedly long distance given their coefficient of restitution.

As used herein, "Shore D hardness" of a cover is measured generally in accordance with ASTM D-2240, except the measurements are made on the curved surface of a molded cover, rather than on a plaque. Furthermore, the Shore D hardness of the cover is measured while the cover remains over the core. When a hardness measurement is made on a dimpled cover, Shore D hardness is measured at a land area of the dimpled cover.

The cover 14 has a Shore D hardness of 60 or more, and preferably at least 64. The composition of cover 14 preferably but not necessarily includes a hard, high stiffness, preferably but not necessarily high acid ionomer such as that sold by E. I. DuPont de Nemours & Company under the trademark "Surlyn®" and by Exxon Corporation under the tradename "Iotek", or blends thereof. In addition to the Surlyn® and Iotek ionomers, the cover may comprise any ionomer or other impact resistant material which either alone or in combination with ionomers, such as in hard/soft blends, produces a molded cover having a Shore D hardness of at least 60, and preferably at least 64. Preferable cover materials include, for example, zinc, sodium and lithium ionomers, and blends of ionomers with harder non-ionic polymers such as nylon, polyphenylene oxide, metallocene catalyzed polyolefins, and other compatible thermoplastics. Examples of cover compositions which may be used are set forth in detail in copending U.S. Ser. No. 08/596,690, which is a continuation of U.S. Ser. No. 08/174,765, which in turn is a continuation of U.S. Ser. No. 07/776,803 filed Oct. 15, 1991, and U.S. Ser. No. 08/493,089, which is a continuation of U.S. Ser. No. 07/981,751, which in turn is a continuation of U.S. Ser. No. 07/901,660 filed Jun. 19, 1992, both incorporated herein by reference. Of course, the cover compositions are not limited in any way to the compositions set forth in said copending applications.

The cover and/or core may include fillers which include, but are not limited to, clay, talc, asbestos, graphite, glass, mica, calcium metasilicate, barium sulfate, zinc sulfide, aluminum hydroxide, silicates, diatomaceous earth, carbonates such as calcium carbonate, magnesium carbonate and the like, metals such as titanium, tungsten, aluminum, bismuth, nickel, molybdenum, iron, copper, brass, boron, bronze, cobalt and beryllium, and alloys of the above metals, metal oxides such as zinc oxide, iron oxide, aluminum oxide, titanium oxide, magnesium oxide, zirconium oxide and the like, particulate synthetic plastic such as high molecular weight polyethylene, polystyrene, polyethylene ionomer resins and the like, particulate carbonaceous materials such as carbon black, natural bitumen and the like, as well as cotton flock, cellulose flock, and leather fiber. Dark colored fillers generally are not preferred for use at the outer surface of the ball if a white ball is desired. Thus, a two-layer cover in which a non-white filler is only present in the inner cover layer can be employed. The amount of filler employed is primarily a function of weight restrictions. For example, weight may be removed from the core and placed in the inner and/or outer cover. This added weight will change the moment of inertia of the ball thereby potentially altering performance. Whereas typically the specific gravity of the cover layer or layers is about 0.95–1.00, it may be desirable to increase the specific gravity of one or more of the cover layers to greater than 1.0, preferably 1.1–2.0.

Figure 2:
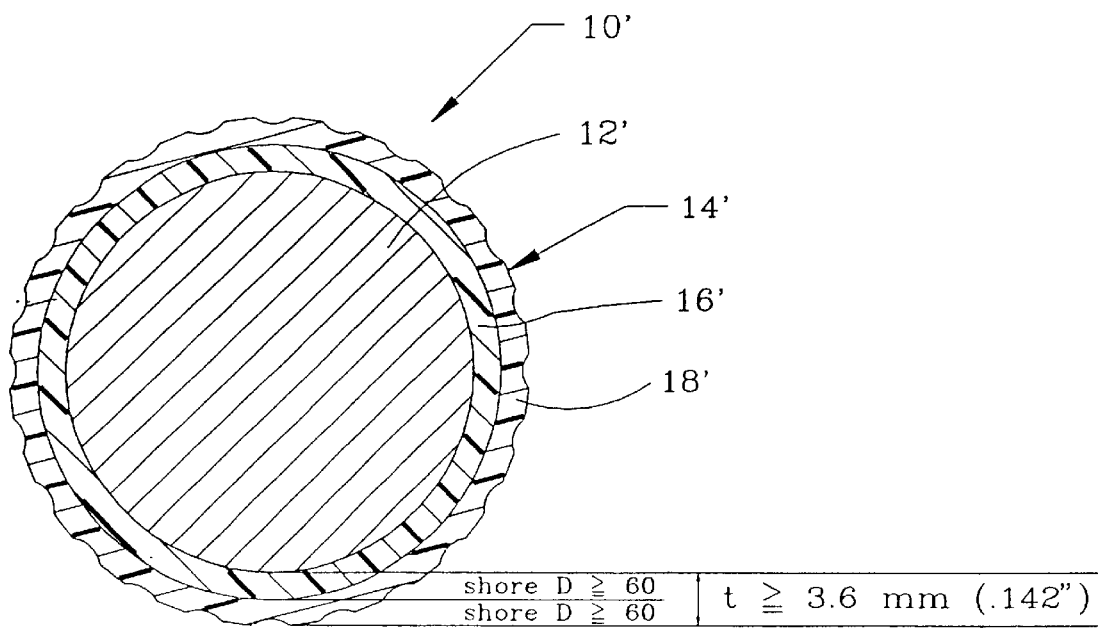
FIG. 2 shows a cross section of a three-piece solid golf ball according to the invention.

A second embodiment of a golf ball according to the invention is shown in FIG. 2, and is designated as 10'. The ball 10' has a core 12' which is a substantially solid material, as is illustrated in FIG. 2. The core 12' preferably has a PGA compression of about 85 or less, preferably 20 to 85, and more preferably 40–60. A multi-layer cover 14' having two or more layers is formed over the core 12'. In the embodiment shown, the cover 14' includes two layers, namely an inner cover layer 16' and an outer cover layer 18'. The inner and outer cover layers have substantially the same Shore D hardness. In other words, the difference between the Shore D hardness of the inner cover layer 16' and outer cover layer 18' is 5 or less, and preferably is 2 or less. Each of the inner and outer layers 16' and 18' has a Shore D hardness of at least 60. The overall thickness of the inner and outer cover layers is the same as the thickness of the cover 14 of the embodiment of FIG. 1. Each of the 2 or more cover layers is at least 0.25 mm thick (0.010 inches) and typically is 0.64 to 6.4 mm (0.025 to 0.250 inches) thick, more preferably 1.3 to 5.1 mm (0.051–0.020 inches) thick. The inner and outer cover layers 16' and 18' preferably are formed from the same composition, and preferably comprise ionomer, ionomer blends, or filled or reinforced ionomers.

As suggested above, two principal properties involved in golf ball performance are resilience and PGA compression. Resilience is determined by the coefficient of restitution (C.O.R.), the constant "e" which is the ratio of the relative velocity of an elastic sphere after direct impact to that before impact. As a result, the coefficient of restitution ("e") can vary from 0 to 1, with 1 being equivalent to a perfectly or completely elastic collision and 0 being equivalent to a perfectly or completely inelastic collision.

Resilience (C.O.R.), along with additional factors such as club head speed, angle of trajectory and ball configuration (i.e., dimple pattern) generally determine the distance a ball will travel when hit. Since club head speed and the angle of trajectory are factors not easily controllable by a manufacturer, factors of concern among manufacturers are the coefficient of restitution (C.O.R.) and the surface configuration of the ball.

The coefficient of restitution (C.O.R.) in solid core balls is a function of the composition of the molded core and of the cover. In balls containing a wound core (i.e., balls comprising a liquid or solid center, elastic windings, and a cover), the coefficient of restitution is a function of not only the composition of the center and cover, but also the composition and tension of the elastomeric windings. Although both the core and the cover contribute to the coefficient of restitution, the present invention is directed to the enhanced coefficient of restitution (and thus travel distance) which is affected by the cover composition.

The coefficient of restitution is the ratio of the outgoing velocity to the incoming velocity. In the examples of this application, the coefficient of restitution of a golf ball was measured by propelling a ball horizontally at a speed of 125±1 feet per second (fps) against a generally vertical, hard, flat steel plate and measuring the ball's incoming and outgoing velocity electronically. Speeds were measured with a pair of Ohler Mark 55 ballistic screens, which provide a timing pulse when an object passes through them. The screens are separated by 36" and are located 25.25" and 61.25' from the rebound wall. The ball speed was measured by timing the pulses from screen 1 to screen 2 on the way into the rebound wall (as the average speed of the ball over 36'), and then the exit speed was timed from screen 2 to screen 1 over the same distance. The rebound wall was tilted 2 degrees from a vertical plane to allow the ball to rebound slightly downward in order to miss the edge of the cannon that fired it.

As indicated above, the incoming speed should be 125+/−1 fps. Furthermore, the correlation between COR and forward or incoming speed has been studied and a correction has been made over the +/−1 fps range so that the COR is reported as if the ball had an incoming speed of exactly 125.0 fps.

The coefficient of restitution must be carefully controlled in all commercial golf balls if the ball is to be within the specifications regulated by the United States Golf Association (U.S.G.A.). Along this line, the U.S.G.A. standards indicate that a "regulation" ball cannot have an initial velocity (i.e., the speed off the club) exceeding 255 feet per second. Since the coefficient of restitution of a ball is related to the ball's initial velocity, it is highly desirable to produce a ball having sufficiently high coefficient of restitution to closely approach the U.S.G.A. limit on initial velocity, while having an ample degree of softness (i.e., hardness) to produce enhanced playability (i.e., spin, etc.).

As indicated above, PGA compression is another important property involved in the performance of a golf ball. The compression of the ball can affect the playability of the ball on striking and the sound or "click" produced. PGA compression is generally equal to 160 minus Riehle compression.

The specially produced core compositions and resulting molded cores of the preferred embodiment of the present invention are preferably manufactured using relatively conventional techniques. In this regard, the core compositions of the invention may be based on polybutadiene, natural rubber, metallocene catalyzed polyolefins such as EXACT (Exxon Chem. Co.) and ENGAGE (Dow Chem. Co.), polyurethanes, other thermoplastic or thermoset elastomers, and mixtures of one or more of the above materials with each other and/or with other elastomers. The core may be formed from a uniform composition or may be a dual or multi-layer core. The core may be foamed or unfoamed. It is preferred that the base elastomer have a relatively high molecular weight. Polybutadiene has been found to be particularly useful because it imparts to the golf balls a relatively high coefficient of restitution. Polybutadiene can be cured using a free radical initiator such as a peroxide, or can be sulfur cured. A broad range for the molecular weight of preferred base elastomers is from about 50,000 to about 500,000. A more preferred range for the molecular weight of the base elastomer is from about 100,000 to about 500,000. As a base elastomer for the core composition, cis-1-4-polybutadiene is preferably employed, or a blend of cis-1-4-polybutadiene with other elastomers may also be utilized. Most preferably, cis-1-4-polybutadiene having a weight-average molecular weight of from about 100,000 to about 500,000 is employed. Along this line, it has been found that the high cis-1-4-polybutadienes manufactured and sold by Bayer Corp., Germany, under the trade name Taktene 220 or 1220 are particularly preferred. Furthermore, the core may be comprised of a crosslinked natural rubber, EPDM, metallocene catalyzed polyolefin, or another crosslinkable elastomer.

When polybutadiene is used for golf ball cores, it commonly is crosslinked with an unsaturated carboxylic acid co-crosslinking agent. The unsaturated carboxylic acid component of the core composition typically is the reaction product of the selected carboxylic acid or acids and an oxide or carbonate of a metal such as zinc, magnesium, barium, calcium, lithium, sodium, potassium, cadmium, lead, tin, and the like. Preferably, the oxides of polyvalent metals such as zinc, magnesium and cadmium are used, and most preferably, the oxide is zinc oxide.

Exemplary of the unsaturated carboxylic acids which find utility in the core compositions are acrylic acid, methacrylic acid, itaconic acid, crotonic acid, sorbic acid, and the like, and mixtures thereof. Preferably, the acid component is either acrylic or methacrylic acid. Usually, from about 5 to about 40, and preferably from about 15 to about 30 parts by weight of the carboxylic acid salt, such as zinc diacrylate, is included in the core composition. The unsaturated carboxylic acids and metal salts thereof are generally soluble in the elastomeric base, or are readily dispersible.

The free radical initiator included in the core composition is any known polymerization initiator (a co-crosslinking agent) which decomposes during the cure cycle. The term "free radical initiator" as used herein refers to a chemical which, when added to a mixture of the elastomeric blend and a metal salt of an unsaturated, carboxylic acid, promotes crosslinking of the elastomers by the metal salt of the unsaturated carboxylic acid. The amount of the selected initiator present is dictated only by the requirements of catalytic activity as a polymerization initiator. Suitable initiators include peroxides, persulfates, azo compounds and hydrazides. Peroxides which are readily commercially available are conveniently used in the present invention, generally in amounts of from about 0.1 to about 10.0 and preferably in amounts of from about 0.3 to about 3.0 parts by weight per each 100 parts of elastomer.

Exemplary of suitable peroxides for the purposes of the present invention are dicumyl peroxide, n-butyl 4,4'-bis(butylperoxy)valerate, 1,1-bis(t-butylperoxy)-3,3,5-trimethyl cyclohexane, di-t-butyl peroxide and 2,5-di-(t-butylperoxy)-2,5 dimethyl hexane and the like, as well as mixtures thereof. It will be understood that the total amount of initiators used will vary depending on the specific end product desired and the particular initiators employed.

Examples of such commercially available peroxides are Luperco 230 or 231 XL sold by Atochem, Lucidol Division, Buffalo, N.Y., and Trigonox 17/40 or 29/40 sold by Akzo Chemicals, America, Chicago, Ill. In this regard Luperco 230 XL and Trigonox 29/40 are comprised of 1,1-bis(t-butylperoxy-3,3,5-trimethyl cyclohexane. The one hour half life of Luperco 231 XL is about 112° C., and the one hour half life of Trigonox 29/40 is about 129° C.

The core compositions of the present invention may additionally contain any other suitable and compatible modifying ingredients including, but not limited to, metal oxides, fatty acids, and diisocyanates and polypropylene powder resin. For example, Papi 94, a polymeric diisocyanate, commonly available from Dow Chemical Co., Midland, Mich., is an optional component in the rubber compositions. It can range from about 0 to 5 parts by weight per 100 parts by weight rubber (phr) component, and acts as a moisture scavenger. In addition, it has been found that the addition of a polypropylene powder resin results in a core which is hard (i.e. exhibits high PGA compression) and thus allows for a reduction in the amount of crosslinking co-agent utilized to soften the core to a normal or below normal compression.

Furthermore, because polypropylene powder resin can be added to a core composition without an increase in weight of the molded core upon curing, the addition of the polypropylene powder allows for the addition of higher specific gravity fillers, such as mineral fillers. Since the crosslinking agents utilized in the polybutadiene core compositions are expensive and/or the higher specific gravity fillers are relatively inexpensive, the addition of the polypropylene powder resin substantially lowers the cost of the golf ball cores while maintaining, or lowering, weight and compression.

The polypropylene ($C_3H_5$) powder suitable for use in the present invention has a specific gravity of about 0.90 g/cm$^3$, a melt flow rate of about 4 to about 12 and a particle size distribution of greater than 99% through a 20 mesh screen. Examples of such polypropylene powder resins include those sold by the Amoco Chemical Co., Chicago, Ill., under the designations "6400 P", "7000 P" and "7200 P". Generally, from 0 to about 25 parts by weight polypropylene powder per each 100 parts of elastomer are included in the present invention.

Various activators may also be included in the compositions of the present invention. For example, zinc oxide and/or magnesium oxide are activators for the polybutadiene. The activator can range from about 2 to about 30 parts by weight per 100 parts by weight of the rubbers (phr) component.

Moreover, reinforcement agents may be added to the core compositions of the present invention. Since the specific gravity of polypropylene powder is very low, and when compounded, the polypropylene powder produces a lighter molded core, when polypropylene is incorporated in the core compositions, relatively large amounts of higher specific gravity fillers may be added so long as the specific core weight limitations are met. As indicated above, additional benefits may be obtained by the incorporation of relatively large amounts of higher specific gravity, inexpensive mineral fillers such as calcium carbonate. Such fillers as are incorporated into the core compositions should be in finely divided form, as for example, in a size generally less than about 30 mesh and preferably less than about 100 mesh U.S. standard size. The amount of additional filler included in the core composition is primarily dictated by weight restrictions and preferably is included in amounts of from about 10 to about 100 parts by weight per 100 parts rubber.

The preferred fillers are relatively inexpensive and heavy and serve to lower the cost of the ball and to increase the weight of the ball to closely approach the U.S.G.A. weight limit of 1.620 ounces. However, if thicker cover compositions are to be applied to the core to produce larger than normal (i.e. greater than 1.680 inches in diameter) balls, use of such fillers and modifying agents will be limited in order to meet the U.S.G.A. maximum weight limitations of 1.620 ounces. Limestone is ground calcium/magnesium carbonate and is used because it is an inexpensive, heavy filler. Ground flash filler may be incorporated and is preferably 20 mesh ground up center stock from the excess flash from compression molding. It lowers the cost and may increase the hardness of the ball.

Fatty acids or metallic salts of fatty acids may also be included in the compositions, functioning to improve moldability and processing. Generally, free fatty acids having from abut 10 to about 40 carbon atoms, and preferably having from about 15 to about 10 carbon atoms, are used. Exemplary of suitable fatty acids are stearic acid and linoleic acids, as well as mixtures thereof. Exemplary of suitable metallic salts of fatty acids include zinc stearate. When included in the core compositions, the metallic salts of fatty acids are present in amounts of from about 1 to about 25, preferably in amounts from about 2 to about 15 parts by weight based on 100 parts rubber (elastomer). It is preferred that the core compositions include stearic acid as the fatty acid adjunct in an amount of from about 2 to about 5 parts by weight per 100 parts of rubber.

Diisocyanates may also be optionally included in the core compositions when utilized, the diisocyanates are included in amounts of from about 0.2 to about 5.0 parts by weight based on 100 parts rubber. Exemplary of suitable diisocyanates is 4,4'-diphenylmethane diisocyanate and other polyfunctional isocyanates known to the art.

Furthermore, the dialkyl tin difatty acids set forth in U.S. Pat. No. 4,844,471, the dispensing agents disclosed in U.S. Pat. No. 4,838,556, and the dithiocarbamates set forth in U.S. Pat. No. 4,852,884 may also be incorporated into the polybutadiene compositions of the present invention. The specific types and amounts of such additives are set forth in the above identified patents, which are incorporated herein by reference.

The core compositions of the invention which contain polybutadiene are generally comprised of 100 parts by weight of a base elastomer (or rubber) selected from polybutadiene and mixtures of polybutadiene with other elastomers, to 25 parts by weight of at least one metallic salt of an unsaturated carboxylic acid, and 0.5 to 10 parts by weight of a free radical initiator.

As indicated above, additional suitable and compatible modifying agents such as particulate polypropylene resin, fatty acids, and secondary additives such as pecan shell flour, ground flash (i.e. grindings from previously manufactured cores of substantially identical construction), barium sulfate, zinc oxide, etc. may be added to the core compositions to adjust the weight of the ball as necessary in order to have the finished molded ball (core, cover and coatings) to closely approach the U.S.G.A. weight limit of 1.620 ounces.

In producing solid golf ball cores utilizing the present compositions, the ingredients may be intimately mixed using, for example, two roll mills or an internal mixer until the composition is uniform, usually over a period of from about 5 to about 20 minutes. The sequence of addition of components is not critical. A preferred blending sequence is as follows.

The elastomer, polypropylene powder resin (if desired), fillers, zinc salt, metal oxide, fatty acid, and the metallic dithiocarbamate (if desired), surfactant (if desired), and tin difatty acid (if desired), are blended for about 7 minutes in an internal mixer such as a Banbury® (Farrel Corp.) mixer. As a result of shear during mixing, the temperature rises to about 200° F. The initiator and diisocyanate are then added and the mixing continued until the temperature reaches about 220° F. whereupon the batch is discharged onto a two roll mill, mixed for about one minute and sheeted out.

The sheet is rolled into a "pig" and then placed in a Barwell preformer and slugs are produced. The slugs are then subjected to compression molding at about 320° F. for about 14 minutes. After molding, the molded cores are cooled, the cooling effected at room temperature for about 4 hours or in cold water for about one hour. The molded cores can be subjected to a centerless grinding operation whereby a thin layer of the molded core is removed to produce a round core having a diameter of 1.2 to 1.5 inches. Alternatively, the cores are used in the as-molded state with no grinding needed to achieve roundness.

The mixing is desirably conducted in such a manner that the composition does not reach incipient polymerization temperatures during the blending of the various components.

Usually the curable component of the composition will be cured by heating the composition at elevated temperatures on the order of from about 275° F. to about 350° F., preferably and usually from about 290° F. to about 325° F., with molding of the composition effected simultaneously with the curing thereof. The composition can be formed into a core structure by any one of a variety of molding techniques, e.g. injection, compression, or transfer molding. When the composition is cured by heating, the time required for heating will normally be short, generally from about 10 to about 20 minutes, depending upon the particular curing agent used. Those of ordinary skill in the art relating to free radical curing agents for polymers are conversant with adjustments of cure times and temperatures required to effect optimum results with any specific free radical agent.

After molding, the core is removed from the mold and the surface thereof optionally is treated to facilitate adhesion thereof to the covering materials. Surface treatment can be effected by any of the several techniques known in the art, such as corona discharge, ozone treatment, sand blasting, and the like. Preferably, surface treatment is effected by grinding with an abrasive wheel.

As indicated above, the cover of the golf ball preferably but not necessarily comprises an ionomer. High or low acid ionomers, or ionomer blends can be used. The high acid ionomers which may be suitable for use in formulating the cover compositions are ionic copolymers which are the metal, i.e., sodium, zinc, magnesium, lithium, etc., salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (i.e., iso- or n-butylacrylate, etc.) can also be included to produce a softer terpolymer. The carboxylic acid groups of the copolymer are at least partially neutralized (i.e., approximately 10–100%, preferably 30–70%) by the metal ions. Each of the high acid ionomer resins contains greater than about 16% by weight of a carboxylic acid, preferably from about 17% to about 25% by weight of a carboxylic acid, more preferably from about 18.5% to about 21.5% by weight of a carboxylic acid.

The high acid ionomeric resins available from Exxon under the designation "Iotek", are somewhat similar to the high acid ionomeric resins available under the "Surlyn®" trademark. However, since the Iotek ionomeric resins are sodium, lithium or zinc salts of poly(ethylene-acrylic acid) and the "Surlyn®" resins are zinc, sodium, lithium, etc. salts of poly(ethylene-methacrylic acid), distinct differences in properties exist.

Non-limiting examples of the high acid methacrylic acid based ionomers suitable for use in accordance with this invention include Surlyn® 8140 (Na), 8220 (Na), 8240 (Na), 9120 (Zn), 9220 (Zn), AD8181 (Li), AD8530 (Zn), AD8531 (Na) and SEP 671 (Li).

|  | SURLYN® 8140 (19 wt % acid) | SURLYN® 9120 (19 wt % acid) |
|---|---|---|
| IONOMER |  |  |
| Cation | Na | Zn |
| Melt Flow Index, g/10 min. | 2.6 | 1.3 |
| Specific gravity | 0.96 | 0.97 |
| MP, ° C. | 88 | 85 |
| FP, ° C. | 49 | 50 |
| MECHANICAL PROPERTIES |  |  |
| Tensile Strength, kpsi (MPa) | 5.0 (34.5) | 3.8 (26.2) |
| Yield Strength, kpsi (MPa) | 2.8 (19.3) | 2.4 (16.6) |
| Elongation, % | 340 | 280 |
| Flex Mod, kpsi (MPa) | 71 (490) | 84 (440) |
| Shore D Hardness | 70 | 69 |

Examples of the high acid acrylic acid based ionomers suitable for use in the present invention also include Iotek high acid ethylene acrylic acid ionomers produced by Exxon such as 1001, 1002, 959, 960, 989, 990, 1003, 1004, 993, and 994. In this regard, Iotek 959 is a sodium ion neutralized ethylene-acrylic acid copolymer. According to Exxon, Ioteks 959 and 960 contain from about 19.0 to about 21.0% by weight acrylic acid with approximately 30 to about 70 percent of the acid groups neutralized with sodium and zinc ions, respectively. The physical properties of these and other high acid acrylic acid based ionomers are as follows:

TABLE 2

Iotek Resins

| PROPERTY | 1001 | 1002 | 959 | 1003 | 1004 | 960 |
|---|---|---|---|---|---|---|
| Melt index, g/10 min. | 1.0 | 1.6 | 2.0 | 1.1 | 2.0 | 1.8 |
| Cation | Na | Na | Na | Zn | Zn | Zn |
| Melting point, ° F. | 183 | 183 | 172 | 180 | 180.5 | 174 |
| Crystallization point, ° F. | 107 | 110 | 106 | 125 | 126.5 | 120 |
| Vicat Softening Point, ° F. | 125 | 125 | 130 | 133 | 131 | 131 |
| Tensile @ Break | 34.4 MPa | 31.7 MPa | 4600 psi | 24.8 MPa | 20.6 MPa | 3500 psi |
| Tensile @ Yield | 21.8 MPa | 22.5 MPa | — | 14.9 MPa | 14.0 MPa | — |
| 1% Secant Modulus | 356 MPa | 418 MPa | 350 MPa | 145 MPa | 128 MPa | 140 MPa |
| Elongation @ Break, % | 341 | 348 | 325 | 387 | 437 | 430 |
| Hardness, Shore D | 63 | 62 | 66 | 54 | 53 | 57 |
| Flexural Modulus | 365 MPa | 380 MPa | 66,000 psi | 147 MPa | 130 MPa | 27,000 psi |
| Density | .9558 g/cm³ | .9557 g/cm³ | .968 g/cm³ | .9715 g/cm³ | .9691 g/cm³ | .980 g/cm³ |

|  |  | EX 989 | EX 993 | EX 994 | EX 990 |
|---|---|---|---|---|---|
| Melt index | g/10 min | 1.30 | 1.25 | 1.32 | 1.24 |
| Moisture | ppm | 482 | 214 | 997 | 654 |
| Cation Type | — | Na | Li | K | Zn |
| M + content by AAS | wt % | 2.74 | 0.87 | 4.54 | 0 |
| Zn content by AAS | wt % | 0 | 0 | 0 | 3.16 |
| Density | kg/m3 | 959 | 945 | 976 | 977 |
| Vicat softening point | ° C. | 52.5 | 51 | 50 | 55.0 |
| Crystallization point | ° C. | 40.1 | 39.8 | 44.9 | 54.4 |
| Melting point | ° C. | 82.6 | 81.0 | 80.4 | 81.0 |
| Tensile at yield | MPa | 23.8 | 24.6 | 22 | 16.5 |
| Tensile at break | MPa | 32.3 | 31.1 | 29.7 | 23.8 |
| Elongation at break | % | 330 | 260 | 340 | 357 |
| 1% secant modulus | MPa | 389 | 379 | 312 | 205 |
| Flexural modulus | MPa | 340 | 368 | 303 | 183 |
| Abrasion resistance | mg | 20.0 | 9.2 | 15.2 | 20.5 |
| Hardness Shore D | — | 62 | 62.5 | 61 | 56 |
| Zwick rebound | % | 61 | 63 | 59 | 48 |

Furthermore, as a result of the development by the assignee of this application of a number of new ionomers neutralized to various extents by several different types of metal cations, such as by manganese, lithium, potassium, calcium and nickel cations, several new ionomers and/or ionomer blends besides sodium, zinc and magnesium high acid ionomers or ionomer blends are now available for golf ball cover production. In particular it has been found that new cation neutralized high acid ionomer blends produce inner cover layer compositions exhibiting enhanced hardness and resilience due to synergies which occur during processing. Consequently, the metal cation neutralized high acid ionomer resins recently produced can be blended to produce substantially higher C.O.R.'s than those produced by the low acid ionomer inner cover compositions presently commercially available.

More particularly, several new metal cation neutralized high acid ionomer resins have been produced by the inventor by neutralizing, to various extents, high acid copolymers of an alpha-olefin and an alpha, beta-unsaturated carboxylic acid with a wide variety of different metal cation salts. It has been found that numerous new metal cation neutralized high acid ionomer resins can be obtained by reacting a high acid copolymer (i.e. a copolymer containing greater than 16% by weight acid, preferably from about 17 to about 25 weight percent acid, and more preferably about 20 weight percent acid), with a metal cation salt capable of ionizing or neutralizing the copolymer to the extent desired (i.e. from about 10% to 90%).

The base copolymer is made up of greater than 16% by weight of an alpha, beta-unsaturated carboxylic acid and an alpha-olefin. As indicated above, a softening comonomer can be included in the copolymer. Generally, the alpha-olefin has from 2 to 10 carbon atoms and is preferably ethylene, and the unsaturated carboxylic acid is a carboxylic acid having from about 3 to 8 carbons. Examples of such acids include acrylic acid, methacrylic acid, ethacrylic acid, chloroacrylic acid, crotonic acid, maleic acid, fumaric acid, and itaconic acid, with acrylic acid being preferred.

The softening comonomer that can be optionally included in the inner cover layer for the golf ball of the invention may be selected from the group consisting of vinyl esters of aliphatic carboxylic acids wherein the acids have 2 to 10 carbon atoms, vinyl ethers wherein the alkyl groups contains 1 to 10 carbon atoms, and alkyl acrylates or methacrylates wherein the alkyl group contains 1 to carbon atoms. Suitable softening comonomers include vinyl acetate, methyl acrylate, methyl methacrylate, ethyl acrylate, ethyl methacrylate, butyl acrylate, butyl methacrylate, or the like.

Consequently, examples of a number of copolymers suitable for use to produce the high acid ionomers included in the present invention include, but are not limited to, high acid embodiments of an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, etc. The base copolymer broadly contains greater than 16% by weight unsaturated carboxylic acid, from about 39 to about 83% by weight ethylene and from 0 to about 40% by weight of a softening comonomer. Preferably, the copolymer contains about 20% by weight unsaturated carboxylic acid and about 80% by weight ethylene. Most preferably, the copolymer contains about 20% acrylic acid with the remainder being ethylene.

Along these lines, examples of the preferred high acid base copolymers which fulfill the criteria set forth above, are a series of ethylene-acrylic copolymers which are commercially available from The Dow Chemical Company, Midland, Mich., under the "Primacor" designation. These high acid base copolymers exhibit the typical properties set forth below in Table 3.

Due to the high molecular weight of the Primacor 5981 grade of ethylene-acrylic acid copolymer, this copolymer is the more red grade utilized in the invention.

The metal cation salts utilized in the invention are those salts provide the metal cations capable of neutralizing, to various extents, the carboxylic acid groups of the high acid copolymer. These include acetate, oxide or hydroxide salts of lithium, calcium, zinc, sodium, potassium, nickel, magnesium, and manganese.

Examples of such lithium ion sources are lithium hydroxide monohydrate, lithium hydroxide, lithium oxide and lithium acetate. Sources for the calcium ion include calcium hydroxide, calcium acetate and calcium oxide. Suitable zinc ion sources are zinc acetate dihydrate and zinc acetate, a blend of zinc oxide and acetic acid. Examples of sodium ion sources are sodium hydroxide and sodium acetate. Sources for the potassium ion include potassium hydroxide and potassium acetate. Suitable nickel ion sources are nickel acetate, nickel oxide and nickel hydroxide. Sources of magnesium include magnesium oxide, magnesium hydroxide, magnesium acetate. Sources of manganese include manganese acetate and manganese oxide.

The new metal cation neutralized high acid ionomer resins are produced by reacting the high acid base copolymer with various amounts of the metal cation salts above the crystalline melting point of the copolymer, such as at a temperature from about 200° F. to about 500° F., preferably from about 250° F. to about 350° F. under high shear conditions at a pressure of from about 10 psi to 10,000 psi. Other blending techniques may also be used. The amount of metal cation salt utilized to produce the new metal cation neutralized high acid based ionomer resins is the quantity which provides a sufficient amount of the metal cations to neutralize the desired percentage of the carboxylic acid groups in the high acid copolymer. The extent of neutralization is generally from about 10% to about 90%.

When the acid groups of copolymers of acrylic acid and ethylene sold by The Dow Chemical Co. (Midland, Mich.) and designated as "Primacor 5981" were neutralized to various weight percentages using a number of different cations, a number of different high acid ionomer resins were produced. Due to differences in the nature of the cation salts, the amount of cation salts utilized, etc., the new high acid ionomer resins produced differed substantially in the extent of neutralization and in melt indices, as well as in resilience (i.e. C.O.R.) and hardness values.

For the purpose of determining the weight percent of neutralization of the carboxylic acid groups in the acrylic

TABLE 3

Typical Properties of Primacor Ethylene-Acrylic Acid Copolymers

| GRADE | PERCENT ACID | DENSITY, g/cc | MELT INDEX, g/10 min | TENSILE YD. ST (psi) | FLEXURAL MODULUS (psi) | VICAT SOFT PT (° C.) | SHORE D HARDNESS |
|---|---|---|---|---|---|---|---|
| ASTM | | D-792 | D-1238, 190° C. | D-638 | D-790 | D-1525 | D-2240 |
| 5980 | 20.0 | 0.958 | 300.0 | — | 4800 | 43 | 50 |
| 5990 | 20.0 | 0.955 | 1300.0 | 650 | 2600 | 40 | 42 |
| 5990 | 20.0 | 0.955 | 1300.0 | 650 | 3200 | 40 | 42 |
| 5981 | 20.0 | 0.960 | 300.0 | 900 | 3200 | 46 | 48 |
| 5981 | 20.0 | 0.960 | 300.0 | 900 | 3200 | 46 | 48 |
| 5983 | 20.0 | 0.958 | 500.0 | 850 | 3100 | 44 | 45 |
| 5991 | 20.0 | 0.953 | 2500.0 | 635 | 2600 | 38 | 40 | acid/ethylene copolymer after reacting with various cation salts, it was assumed that one mole of sodium ($Na^+$), potassium ($K^+$), and lithium ($Li^+$) neutralized one mole of acrylic acid, and that one mole of zinc ($Zn^{2+}$), magnesium ($Mg^{2+}$), manganese ($Mn^{2+}$), calcium ($Ca^{2+}$) and nickel ($Ni^{2+}$) neutralized two moles of acrylic acid. The calculations of neutralization were based upon an acrylic acid molecular weight of 79 g/m, giving 0.2778 moles per 100 grams of copolymer.

As indicated below in Table 4, the various cation salts were added in variable amounts to the 20 weight percent acrylic acid/ethylene copolymer in order to determine the optimal level of neutralization for each of the cations. In Table 4, NaOH refers to sodium hydroxide (formula weight of 40). MnAc refers to manganese acetate tetrahydrate having a formula weight of 245. LiOH is lithium hydroxide, fwt=24. KOH is potassium hydroxide, fwt=56. ZnAc is zinc acetate dihydrate, fwt=219.5. MgAc is magnesium acetate tetrahydrate, fwt=214.4. CaAc is calcium acetate, fwt=158. MgO is magnesium oxide, fwt=40.3. NiAc is nickel acetate, fwt=176.8. All of these cation salts are solids at room temperature.

The specific cation salts were added in differing amounts with the 20 weight percent acrylic acid/ethylene copolymer (i.e. the Primacor 5981) to an internal mixer (Banbury type) for the neutralization reaction. The only exception was calcium acetate, which, due to problems encountered in solid form, was added as a 30 wt % solution in water.

In the neutralization reaction, the cation salts solubilized in the Primacor 5981 acrylic acid/ethylene copolymer above the melting point of the copolymer and a vigorous reaction took place with a great deal of foaming occurring as the cation reacted with the carboxylic acid groups of the acrylic acid/ethylene copolymer and the volatile by-products of water (in the case of oxides or hydroxides) or acetic acid (when acetates are used) were evaporated. The reaction was continued until foaming ceased (i.e. about 30–45 minutes at 250–350° F.), and the batch was removed from the Banbury mixer. Mixing continued of the batch obtained from the mixer on a hot two-roll mill (175–250° F.) to complete the neutralization reaction. The extent of the reaction was monitored by measuring melt flow index according to ASTM D-1238-E. As indicated below, the neutralized products exhibited different properties depending upon the nature and amount of the cation salts utilized.

TABLE 4

| Formulation No. | Wt % Cation Salt | Wt % Neutralization | Melt Index | C.O.R. | Shore D Hardness |
|---|---|---|---|---|---|
| 1(NaOH) | 6.98 | 67.5 | 0.9 | .804 | 71 |

TABLE 4-continued

| Formulation No. | Wt % Cation Salt | Wt % Neutralization | Melt Index | C.O.R. | Shore D Hardness |
|---|---|---|---|---|---|
| 2(NaOH) | 5.66 | 54.0 | 2.4 | .808 | 73 |
| 3(NaOH) | 3.84 | 35.9 | 12.2 | .812 | 69 |
| 4(NaOH) | 2.91 | 27.0 | 17.5 | .812 | (brittle) |
| 5(MnAc) | 19.6 | 71.7 | 7.5 | .809 | 73 |
| 6(MnAc) | 23.1 | 88.3 | 3.5 | .814 | 77 |
| 7(MnAc) | 15.3 | 53.0 | 7.5 | .810 | 72 |
| 8(MnAc) | 26.5 | 106 | 0.7 | .813 | (brittle) |
| 9(LiOH) | 4.54 | 71.3 | 0.6 | .810 | 74 |
| 10(LiOH) | 3.38 | 52.5 | 4.2 | .818 | 72 |
| 11(LiOH) | 2.34 | 35.9 | 18.6 | .815 | 72 |
| 12(KOH) | 5.30 | 36.0 | 19.3 | Broke | 70 |
| 13(KOH) | 8.26 | 57.9 | 7.18 | .804 | 70 |
| 14(KOH) | 10.7 | 77.0 | 4.3 | .801 | 67 |
| 15(ZnAc) | 17.9 | 71.5 | 0.2 | .806 | 71 |
| 16(ZnAc) | 13.9 | 53.0 | 0.9 | .797 | 69 |
| 17(ZnAc) | 9.91 | 36.1 | 3.4 | .793 | 67 |
| 18(MgAc) | 17.4 | 70.7 | 2.8 | .814 | 74 |
| 19(MgAc) | 20.6 | 87.1 | 1.5 | .815 | 76 |
| 20(MgAc) | 13.8 | 53.8 | 4.1 | .814 | 74 |
| 21(CaAc) | 13.2 | 69.2 | 1.1 | .813 | 74 |
| 22(CaAc) | 7.12 | 34.9 | 10.1 | .808 | 70 |
| 23(MgO) | 2.91 | 53.5 | 2.5 | .813 | |
| 24(MgO) | 3.85 | 71.5 | 2.8 | .808 | |
| 25(MgO) | 4.76 | 89.3 | 1.1 | .809 | |
| 26(MgO) | 1.96 | 35.7 | 7.5 | .815 | |
| 27(NiAc) | 13.04 | 61.1 | 0.2 | .802 | 71 |
| 28(NiAc) | 10.71 | 48.9 | 0.5 | .799 | 72 |
| 29(NiAc) | 8.26 | 36.7 | 1.8 | .796 | 69 |
| 30(NiAc) | 5.66 | 24.4 | 7.5 | .786 | 64 |

Controls: 50/50 Blend of Ioteks 8000/7030 C.O.R. = .810/65 Shore D Hardness
DuPont High Acid Surlyn ® 8422 (Na) C.O.R. = .811/70 Shore D Hardness
DuPont High Acid Surlyn ® 8162 (Zn) C.O.R. = .807/65 Shore D Hardness
Exxon High Acid Iotek EX-960 (Zn) C.O.R. = .796/65 Shore D Hardness
Control for Formulations 23–26 is 50/50 Iotek 8000/7030, C.O.R. = .814
Formulation 26 C.O.R. was normalized to that control accordingly.
Control for formulation No. 27–30 is 50/50 Iotek 8000/7030, C.O.R. = .807

When compared to low acid versions of similar cation neutralized ionomer resins, the new metal cation neutralized high acid ionomer resins exhibit enhanced hardness, modulus and resilience characteristics. These are properties that are particularly desirable in a number of thermoplastic fields, including the field of golf ball manufacturing.

As will be further noted in the Examples below, either or both high and low acid ionomer resins may be used in the cover compositions so long as the molded cover produces a Shore D hardness of 64 or more. Properties of some low acid ionomer resins are provided in the following table:

TABLE 5

| | Typical Properties of Iotek Ionomers | | | | | |
|---|---|---|---|---|---|---|
| Resin Properties | ASTM Method | Units | 4000 | 4010 | 8000 | 8020 | 6030 |
| Cation Type | | | zinc | zinc | sodium | sodium | sodium |
| Melt Index | D-1238 | g/10 min. | 2.5 | 1.5 | 0.8 | 1.6 | 2.8 |
| Density | D-1505 | kg/m$^3$ | 963 | 963 | 954 | 960 | 960 |
| Melting Point | D-3417 | ° C. | 90 | 90 | 90 | 87.5 | 87.5 |
| Crystallization Point | D-3417 | ° C. | 62 | 64 | 56 | 53 | 65 |
| Vicat Softening Point | D-1525 | ° C. | 62 | 63 | 61 | 64 | 67 |
| % Wt Acrylic Acid | | | 16 | | 11 | | |

TABLE 5-continued

Typical Properties of Iotek Ionomers

| | | | 4000 | 4010 | 8000 | 8020 | 8030 |
|---|---|---|---|---|---|---|---|
| % of Acid Groups cation neutralized | | | 30 | | 40 | | |

| Plaque Properties (3 mm thick, compression molded) | | | 4000 | 4010 | 8000 | 8020 | 8030 |
|---|---|---|---|---|---|---|---|
| Tensile at break | D-638 | MPa | 24 | 26 | 36 | 31.5 | 28 |
| Yield point | D-638 | MPa | none | none | 21 | 21 | 23 |
| Elongation at break | D-638 | % | 395 | 420 | 350 | 410 | 395 |
| 1% Secant modulus | D-638 | MPa | 160 | 160 | 300 | 350 | 390 |
| Shore Hardness D | D-2240 | — | 55 | 55 | 61 | 58 | 59 |

| Film Properties (60 micron film 2.2:1 Blow-up ratio) | | | 4000 | 4010 | 8000 | 8020 | 8030 |
|---|---|---|---|---|---|---|---|
| Tensile at Break | | | | | | | |
| MD | D-882 | MPa | 41 | 39 | 42 | 52 | 47.4 |
| TD | D-682 | MPa | 37 | 38 | 38 | 38 | 40.5 |
| Yield Point | | | | | | | |
| MD | D-882 | MPa | 15 | 17 | 17 | 23 | 21.6 |
| TD | D-882 | MPa | 14 | 15 | 15 | 21 | 20.7 |
| Elongation at Break | | | | | | | |
| MD | D-882 | % | 310 | 270 | 260 | 295 | 305 |
| TD | D-882 | % | 360 | 340 | 280 | 340 | 345 |
| 1% Secant modulus | | | | | | | |
| MD | D-882 | MPa | 210 | 215 | 390 | 380 | 380 |
| TD | D-882 | MPa | 200 | 225 | 380 | 350 | 345 |
| Dart Drop Impact | D-1709 | g/micron | 12.4 | 12.5 | 20.3 | | |

| Resin Properties | ASTM Method | Units | 7010 | 7020 | 7030 |
|---|---|---|---|---|---|
| Cation type | | | zinc | zinc | zinc |
| Melt Index | D-1238 | g/10 min. | 0.8 | 1.5 | 2.5 |
| Density | D-1505 | kg/m$^3$ | 960 | 960 | 960 |
| Melting Point | D-3417 | ° C. | 90 | 90 | 90 |
| Crystallization Point | D-3417 | ° C. | — | — | — |
| Vicat Softening Point | D-1525 | ° C. | 60 | 63 | 62.5 |
| % Wt Acrylic Acid | | | — | — | — |
| % of Acid Groups cation neutralized | | | — | — | — |

| Plaque Properties (3 mm thick, compression molded) | ASTM Method | Units | 7010 | 7020 | 7030 |
|---|---|---|---|---|---|
| Tensile at break | D-638 | MPa | 38 | 38 | 38 |
| Yield Point | D-638 | MPa | none | none | none |
| Elongation at break | D-638 | % | 500 | 420 | 395 |
| 1% Secant modulus | D-638 | MPa | — | — | — |
| Shore Hardness D | D-2240 | — | 57 | 55 | 55 |

Additional materials may also be added to the cover (or inner and outer cover layers) of the present invention as long as they do not substantially reduce the playability properties of the ball. Such materials include dyes (for example, Ultramarine Blue sold by Whitaker, Clark, and Daniels of South Plainsfield, N.J.) (see U.S. Pat. No. 4,679,795), optical brighteners, pigments such as titanium dioxide, zinc oxide, barium sulfate and zinc sulfate; UV absorbers; antioxidants; antistatic agents; and stabilizers. Moreover, the cover compositions of the present invention may also contain softening agents such as those disclosed in U.S. Pat. Nos. 5,312,857 and 5,306,760, including plasticizers, metal stearates, processing acids, etc., and reinforcing materials such as glass fibers and inorganic fillers, as long as the desired properties produced by the golf ball covers of the invention are not impaired.

Moreover, since there are various hues of white, i.e. blue white, yellow white, etc., trace amounts of blue pigment may be added to the cover stock composition to impart a blue white appearance thereto. However, if different hues of the color white are desired, different pigments can be added to the cover composition at the amounts necessary to produce the color desired.

In addition, it is within the purview of this invention to add to the cover compositions of this invention compatible materials such as antioxidants (i.e. Santonox R), antistatic agents, stabilizers and processing aids. The cover compositions of the present invention may also contain softening agents, such as plasticizers, etc., and reinforcing materials such as glass fibers and inorganic fillers, as long as the desired properties produced by the golf ball covers of the invention are not impaired.

Furthermore, optical brighteners, such as those disclosed in U.S. Pat. No. 4,679,795, may also be included in the cover composition of the invention. Examples of suitable optical brighteners which can be used in accordance with this invention are Uvitex OB as sold by the Ciba-Geigy Chemical Company, Ardsley, N.Y. Uvitex OB thought to be 2,5-Bis(5-tert-butyl-2-benzoxazoyl)-thiophene. Examples of other optical brighteners suitable for use in accordance with this invention include Leucopure EGM as sold by Sandoz, East Hanover, N.J. 07936. Leucopure EGM is thought to be 7-(2n-naphthol(1,2-d)-triazol-2yl(3phenyl-coumarin. Phorwhite K-20G2 is sold by Mobay Chemical Corporation, P.O. Box 385, Union Metro Park, Union, N.J. 07083, and is thought to be a pyrazoline derivative. Eastobrite OB-1 is 2,2'(1,2-ethenediyldi-4,1-phenylene) bisbenzoxazole and is available from Eastman Chemical Company.

Moreover, since many optical brighteners are colored, the percentage of optical brighteners utilized must not be excessive in order to prevent the optical brightener from functioning as a pigment or dye in its own right.

The percentage of optical brighteners which can be used in accordance with this invention is from about 0.01% to about 0.5% as based on the weight of the polymer used as a cover stock. A more preferred range is from about 0.05% to about 0.25% with the most preferred range from about 0.10% to about 0.20% depending on the optical properties of the particular optical brightener used and the polymeric environment in which it is a part.

Generally, the additives are admixed with a ionomer to be used in the cover composition to provide a masterbatch (M.B.) of desired concentration and an amount of the masterbatch sufficient to provide the desired amounts of additive is then admixed with the copolymer blends.

The above cover compositions, when combined with soft cores at the thicknesses described herein, produce golf balls having a relatively low spin in combination with good click and feel.

The cover compositions and molded balls of the present invention may be produced according to conventional melt blending procedures. In this regard, the ionomeric resins are blended along with the masterbatch containing the desired additives in a Banbury® type mixer, two-roll mill, or extruded prior to molding. The blended composition is then formed into slabs or pellets, etc. and maintained in such a state until molding is desired. Alternatively a simple dry blend of the pelletized or granulated resins and color masterbatch may be prepared and fed directly into the injection molding machine where homogenization occurs in the mixing section of the barrel prior to injection into the mold. If necessary, further additives such as an inorganic filler, etc., may be added and uniformly mixed before initiation of the molding process.

Moreover, golf balls of the present invention can be produced by molding processes currently well known in the golf ball art. Specifically, the golf balls can be produced by conventional molding techniques, such as by injection molding or compression molding the novel cover compositions over the soft polybutadiene cores to produce a golf ball having a diameter of about 1.680 inches or greater, preferably at least 1.70 inches, and weighing about 1.620 ounces. Larger molds are utilized to produce the thicker covered oversized golf balls. For injection-molded covers having a thickness of up to about 3.0 mm, it may be preferable to mold the cover in a single step. For covers of 3.0 mm or more, it may be preferable for reasons of both processability and uniformity to mold the cover in two layers. In compression molding, it may be appropriate to mold a thicker cover in a single layer. In compression molding, the cover composition is formed via injection at about 380° F. to about 450° F. into smooth surfaced hemispherical shells which are then positioned around the core in a dimpled golf ball mold and subjected to compression molding at 200°–300° F. for 2–10 minutes, followed by cooling at 50°–70° F. for 2–10 minutes, to fuse the shells together to form an unitary ball. In addition, the golf balls may be produced by injection molding, wherein the cover composition is injected directly around the core placed in the center of a golf ball mold for a period of time at a mold temperature of from 50° to about 100° F. After molding the golf balls produced may undergo various further finishing steps such as flash trimming, priming, marking, finish coating and the like as is well known and is disclosed, for example in U.S. Pat. No. 4,911,451.

The present invention is further illustrated by the following examples in which the parts of the specific ingredients are by weight (pbw). It is to be understood that the present invention is not limited to the examples, and various changes and modifications may be made in the invention without departing from the spirit and scope thereof.

EXAMPLE 1

A number of golf ball cores having Formulation A, shown below, were prepared.

| Core Formulation A | |
|---|---|
| Material | Parts by Weight |
| SMR - CV 60[1] | 25.00 |
| Taktene 220[2] | 73.50 |
| Hi-Sil 234 LD[3] | 6.00 |
| Zinc Oxide[4] | 5.00 |
| Barytes #22[5] | 80.00 |
| Stearic Acid[6] | 1.60 |
| Agerite Superlite[7] | 1.60 |
| $TiO_2$ Rutile 2020[8] | 3.00 |
| Circolite Oil[9] | 5.00 |
| Red pigment[10] | 3 |
| Sulfur (insol)[11] | 3.14 |
| Santocure N.S.[12] | 1.28 |
| Methyl Zimate[13] | 0.27 |
| D.P.G.[14] | 0.68 |
| | 206.07 |

[1]Natural rubber, Muehlstein, Norwalk, CT
[2]Synthetic polybutadiene, Bayer Corp., Akron, OH
[3]Precipitated hydrated silica, PPG Industries, Pittsburgh, PA
[4]Zinc Corp. of America, Monaca, PA
[5]Harwick Chemical, Akron, OH
[6]Harwick Chemical, Akron, OH
[7]R. T. Vanderbilt, Norwalk, CT
[8]Harwick Chemical, Akron, OH
[9]Sun Oil, Philadelphia, PA
[10]Stauffer Chemical, Westport, CT
[11]Stauffer Chemical, Westport, CT
[12]R. T. Vanderbilt, Norwalk, CT
[13]R. T. Vanderbilt, Norwalk, CT
[14]1,3-Diphenylguanidine (accelerator) R. T. Vanderbilt, Norwalk, CT One to two dozen cores were made having a diameter of 36.3 mm (1.430 inches) (Example 1-1). One to two dozen cores having a diameter of 37.3 mm (1.470 inches) also were made (Example 1-2). The 36.3 mm diameter cores were cured at 320° F. for 12 minutes, followed by six minutes of cooling using cooling water. The cores having a 37.3 mm diameter were cured at 320° F. for 12 minutes, followed by six minutes of cooling using cooling water. The cores were covered with a single layer of an ionomeric cover material having Cover Formulation W, shown below:

| Cover Formulation W | | | |
|---|---|---|---|
| | Parts by weight | White Masterbatch | Parts by weight |
| Iotek 8000 | 70.6 | Iotek 7030 | 100 |
| Iotek 7010 | 19.9 | Unitane 0-110 | 31.72 |
| White MasterBatch | 9.5 | Ultra Marine Blue | 0.6 |
| | | Eastobrite OB-1 | 0.35 |
| | | Santonox R | 0.05 |

As shown on Table 6 below, the golf balls with a 36.3 mm core diameter had an overall weight of 43.5 grams, a cover thickness of 3.68 mm (0.145 inches), a PGA compression of 78, and a coefficient of restitution of 0.744 (Example 1-1). The golf balls with 37.3 mm (1.470 inch) cores had a weight of 44.4 grams, a cover thickness of 3.17 mm (0.125 inches), a PGA compression of 48, and a coefficient of restitution of 0.732 (Example 1-2). These golf balls have excellent feel due to the combination of a hard cover and a very soft core, and could be used as restricted flight golf balls.

A number of golf ball cores having Core Formulation B, shown below, were formed.

| Core Formulation B | |
|---|---|
| Material | Parts by Weight |
| Cariflex BR-1220[1] | 67.35 |
| Taktene 220[2] | 27.50 |
| Natsyn 2200[3] | 5.15 |
| Zinc Oxide[4] | 6.53 |
| Limestone[5] | 8.25 |
| Poly Pro 20 Mesh[6] | 6.19 |
| Regrind[7] | 19.59 |
| Zinc Stearate[8] | 14.78 |
| Zinc Diacrylate[9] | 19.24 |
| Lupersol 230XL OR Triganox 17/40[10] | 1.48 |

[1]Polybutadiene
Muehlstein, Norwalk, CT
[2]Synthetic Polybutadiene
Bayer Corp., Akron, OH
[3]Natural Rubber
Muehlstein, Norwalk, CT
[4]Zinc Corp of America,
Monaca, PA
[5]Lee Lime, Lee, MA
[6]Amoco Chemical
[7]golf ball core regrind
(internal source)
[8]Synpro, Cleveland, OH
[9]Rockland React Rite,
Rockland, GA
[10]peroxide, R. T. Vanderbilt,
Norwalk, CT The cores were cured for 15 minutes at 310° F. followed by 7 minutes of cooling using cooling water. Cores having diameters of 36.3 mm (1.430 inches) (Example 1-4) and of 37.3 mm (1.470 inches) were formed (Example 1-3). Cores having a diameter of 39.2 mm (1.545 inches) also were formed (Example 1-C1) as a control. The cores of Examples 1-3, 1-4 and 1-C1 were covered with a single layer of the same ionomeric cover material as was used in Examples 1-1 and 1-2. The 36.3 mm and 37.3 mm diameter cores resulted in golf balls having an overall diameter of 43.7 mm (1.72 inches) (Examples 1-3 and 1-4). The 39.2 mm cores were used to form golf balls having a diameter of 43.8 mm (1.725 inches) (Example 1-C1).

The golf balls made from 36.3 mm cores (Example 1-4) had a final weight of 44.5 grams, a cover thickness of 3.68 mm (0.145 inches), a PGA compression of 112 and a coefficient of restitution of 0.811. The balls made from 37.3 mm cores (Example 1-3) had a weight of 45.1 grams, a cover thickness of 3.18 mm (0.124 inches), a PGA compression of 105, and a coefficient of restitution of 0.809. The control balls having 39.2 mm cores (Example 1-C1) had an overall weight of 46.0 grams, a cover thickness of 2.29 mm (0.090 inches), a PGA compression of 93, and a coefficient of restitution of 0.812. This Example shows that with the thick covered golf ball of the invention, PGA compression increases with cover thickness, while resulting in only a small change in COR.

EXAMPLE 2

A number of 32.8 mm (1.29 inch) diameter golf ball cores were made using Core Formulation C, shown below. The curing process was the same as the sulfur curing process described above in Example 1. The cores were used to make four different types of golf balls having the cover compositions and thicknesses shown on Table 6 as Examples 2-1 to 2-4. The Iotek 959/960 formulation (Cover Formulation X) also is shown below.

| Core Formulation C | | Cover Formulation X | |
|---|---|---|---|
| | Parts by Weight | | Parts by Weight |
| Cariflex BR 1220 | 80 | Iotek 959 | 45.3 |
| SMR CV 60 | 20 | Iotek 960 | 45.3 |
| Zinc Oxide | 5 | White MasterBatch | 9.4 |
| Limestone | 110 | (see formulation in Ex. 1) | |
| Stearic Acid | 1.6 | | |
| Agerite Superlite | 1.6 | | |
| Circolite Oil | 5 | | |
| Sulfur | 3.14 | | |
| Santocure N.S. | 1.28 | | |
| Methyl Zimate | 0.28 | | |
| D.P.G. | 0.68 | | |
| | 228.58 | | |

The resulting PGA compression and coefficient of restitution of the golf balls also is shown on Table 6. A control example using a 39.2 mm (1.545 inch) core having Core Formulation I, shown below, and a single cover layer with a thickness of 1.78 mm (0.070 inches) also was formed. The physical properties of the resulting balls are shown on Table 6 as 2-C1.

| Core Formulation I | |
|---|---|
| | Parts by Weight |
| Cariflex BR-1220 | 70.80 |
| Taktene 220 | 29.20 |
| Zinc Oxide | 6.93 |
| Limestone | 18.98 |
| Poly Pro 20 Mesh | 2.55 |
| Regrind | 20.07 |
| Zinc Stearate | 20.07 |
| ZDA | 30.29 |
| Blue masterbatch[1] | 0.01 |
| Luperco 231-XL OR Triganox 29/40[2] | 0.90 |

[1] internal source
[2] peroxide, R. T. Vanderbilt, Norwalk, CT

The very thick covered balls had the same overall compression as the thin covered control (2-C1) even though the thick covers were more than double the thickness of the control.

EXAMPLE 3

A number of sulfur-cured golf ball cores having a diameter of 32.5 mm (1.28 inches) and the formulation shown below were formed:

| Core Formulation D | |
|---|---|
| Materials | phr |
| Cariflex BR-1220 | 80 |
| SMR CV-60 | 20 |
| Zinc Oxide | 5 |
| Limestone | 20 |
| Stearic Acid | 1.6 |
| Circolite oil | 5 |
| Sulfur | 3.14 |
| Santocure N.S. | 1.28 |
| Methyl Zimate | 0.28 |
| D.P.G. | 0.68 |
| Agerite White[1] | 0.8 |

[1] R. T. Vanderbilt, Norwalk, CT

The cores were cured for 12 minutes at 320° F., followed by cooling for six minutes with cooling water. The sulfur-cured cores (Examples 3-3, 3-4, 3-7 and 3-8) had a surface Shore A hardness of 71, a Shore C hardness of 35 and a Shore D hardness of 21.

A number of peroxide-cured cores having a diameter of 32.5 mm (1.28 inches) and Core Formulation B, shown above were formed. The cores were cured for 15 minutes at 310° F., followed by cooling for seven minutes using cooling water. The cores (Examples 3-1, 3-2, 3-5 and 3-6) had the PGA compression and COR values shown on Table 6.

A number of "control" cores were made having a diameter of 39.2 mm (1.545 inches) and having Core Formulation F, shown below, were formed (Examples 3-C1 and 3-C2).

| Core Formulation F | |
|---|---|
| | Parts by Weight |
| Cariflex BR-1220 | 70.37 |
| Taktene 220 | 29.63 |

-continued

| Core Formulation F | |
|---|---|
| | Parts by Weight |
| Zinc Oxide | 6.67 |
| Limestone | 24.07 |
| Poly Pro 20 Mesh | 8.89 |
| Regrind | 17.04 |
| Zinc Stearate | 18.52 |
| Zinc Diacrylate | 27.41 |
| Luperco 231-XL or Triganox 17/40 | 0.9 |

Furthermore, a number of "control" cores having a diameter of 39.2 mm (1.545 inches) and having Core Formulation G, shown below, were formed (Examples 3-C3 and 3-C4).

| Core Formulation G | |
|---|---|
| | Parts by Weight |
| Cariflex BR-1220 | 73.33 |
| Taktene 220 | 26.67 |
| Zinc Oxide | 22.33 |
| Regrind | 10 |
| Zinc Stearate | 20 |
| Zinc Diacrylate | 26 |
| Luperco 231-XL or Triganox 17/40 | 0.9 |

The 32.5 mm cores were covered with a 3.35 mm (0.132 inch) thick layer of ionomer followed by a 1.78 mm (0.070 inch) thick layer of the same or a different ionomer. The covers had a "422 tri" dimple pattern, which is the same dimple pattern as is used on the Top Flite Hot XL (1995), tour trajectory ball. The compression and coefficient of the cores, balls having the first cover layer, and balls having the second cover layer, as well as the finished balls, was obtained and is shown on Table 6. The control cores were covered with a single layer of ionomer having a thickness of 0.070 inches.

EXAMPLE 4

A number of thermoplastic golf ball cores containing 100 parts by weight EXACT 4049 (Exxon Chemical Co.) and 60 parts by weight of tungsten powder were formed (Core Formulation H, Examples 4-1, 4-2, 4-5 and 4-6). The cores were cured for 5 minutes at 320° F. followed by cooling using cooling water for 7 minutes. The cores had a weight of 23.3 grams and a diameter of 32.5 mm (1.28 inches). The cores were covered with a 3.35 mm (0.132 inch) thick layer of ionomer, followed by a second cover having a thickness of about 1.78 mm (0.070 inches). The inner and outer cover layers had the formulations shown on Table 1. Cover formulation Y is as follows:

| Cover Formulation Y | |
|---|---|
| | Parts by Weight |
| Iotek 1002 | 45.3 |
| Iotek 1003 | 45.3 |
| White MasterBatch | 9.4 |

-continued

| Cover Formulation Y |
| --- |
| Parts by Weight |
| (see formulation in Ex. 1) |

Cover formulation Z is as follows:

| Cover Formulation Z | |
| --- | --- |
| | Parts by Weight |
| Iotek 8000 | 70.6 |
| Iotek 7010 | 19.9 |
| White MasterBatch | 9.5 |
| (see formulation in Ex. 1) | |

A number of crosslinked cores were made using 100 parts by weight of EXACT 4049 (Exxon Chemical Co.), which is a metallocene catalyzed polyolefin, 60 parts by weight of tungsten powder and 5 parts by weight Trigonox 17/40 (Core Formulation J, Examples 4-3, 4-4 and 4-7). The cores were cured for 14 minutes at 320° F. followed by cooling with cooling water for 7 minutes. The cores had a weight of 23.6 grams. The cores had a diameter of 32.5 mm (1.28 inches), and were covered with the same types and thicknesses of cover materials as were used for the thermoplastic cores. The cover materials are shown on Table 6. The outer covers of Example 4 employed a "422 Hex" dimple pattern, which is the same dimple pattern as is used on the Top Flite XL (1996), regular trajectory ball.

The compression and coefficient values for the balls having a single cover layer, both cover layers, and finished products were determined and are shown on Table 6. As shown by the results, the thick covered balls give relatively soft compression versus the thick covered balls having polybutadiene cores, and demonstrate the variety of properties which are possible with the novel constructions of the invention. The balls of this Example which have cores made of metallocene catalyzed polyolefin would be useful as range or practice balls, as they have a soft feel and high spin, as well as a very durable, hard cover.

TABLE 6

| | CORE | | | | + INNER COVER | | | |
| --- | --- | --- | --- | --- | --- | --- | --- | --- |
| EXAMPLE # | Type[1] | Size mm | Comp (PGA) | COR (×1000) | Type[2] | Thickness mm | Comp (PGA) | COR (×1000) |
| 1-1 | A | 36.322 | — | — | | | | |
| 1-2 | A | 37.338 | — | — | | | | |
| 1-3 | B | 37.338 | — | — | | | | |
| 1-4 | B | 36.322 | — | — | | | | |
| 1-C1 | B | 39.243 | — | — | | | | |
| 2-1 | C | 32.766 | — | — | W | 3.175 | — | — |
| 2-2 | C | 32.766 | — | — | W | 3.556 | — | — |
| 2-3 | C | 32.766 | — | — | X | 3.175 | — | — |
| 2-4 | C | 32.766 | — | — | X | 3.556 | — | — |
| 2-C1 | I | 39.243 | — | — | — | — | — | — |
| 3-1 | B | 32.512 | 71 | 759 | X | 3.353 | 115 | 786 |
| 3-2 | B | 32.512 | 71 | 759 | X | 3.353 | 115 | 786 |
| 3-3 | D | 32.512 | | | X | 3.353 | 75 | 768 |
| 3-4 | D | 32.512 | | | X | 3.353 | 75 | 768 |
| 3-5 | B | 32.512 | 71 | 759 | W | 3.353 | 110 | 772 |
| 3-6 | B | 32.512 | 71 | 759 | W | 3.353 | 110 | 772 |
| 3-7 | D | 32.512 | | | W | 3.353 | 69 | 749 |
| 3-8 | D | 32.512 | | | W | 3.353 | 69 | 749 |
| 3-C1 | F | 39.243 | 98 | 762 | — | — | — | — |
| 3-C2 | F | 39.243 | 98 | 762 | — | — | — | — |
| 3-C3 | G | 39.243 | 87 | 767 | — | — | — | — |
| 3-C4 | G | 39.243 | 87 | 767 | — | — | — | — |
| 4-1 | H | 32.512 | | | Y | 3.353 | 79 | 731 |
| 4-2 | H | 32.512 | | | Z | 3.353 | 77 | 737 |
| 4-3 | J | 32.512 | | | Y | 3.353 | 80 | 740 |
| 4-4 | J | 32.512 | | | Z | 3.353 | 78 | 741 |
| 4-5 | H | 32.512 | | | Y | 3.353 | 79 | 731 |
| 4-6 | H | 32.512 | | | Z | 3.353 | 77 | 737 |
| 4-7 | J | 32.512 | | | Z | 3.353 | 78 | 741 |

| | + OUTER COVER | | | FINISHED BALL | | | SPIN |
| --- | --- | --- | --- | --- | --- | --- | --- |
| EXAMPLE # | Type[2] | Thickness mm | Comp (PGA) | COR (×1000) | Weight (g) | Comp (PGA) | COR (×1000) | Revs/min |
| 1-1 | W | 3.68 | | | 43.5 | 78 | 744 | — |

TABLE 6-continued

| | | | | | | | | |
|---|---|---|---|---|---|---|---|---|
| 1-2 | W | 3.18 | | | 44.4 | 48 | 732 | — |
| 1-3 | W | 3.18 | | | 45.1 | 105 | 809 | — |
| 1-4 | W | 3.68 | | | 44.5 | 112 | 811 | — |
| 1-C1 | W | 2.29 | | | 46.0 | 93 | 812 | — |
| 2-1 | W | 1.778 | | | | 106 | 753 | — |
| 2-2 | W | 1.397 | | | | 105 | 752 | — |
| 2-3 | X | 1.778 | | | | 116 | 746 | — |
| 2-4 | X | 1.397 | | | | 114 | 770 | — |
| 2-C1 | W | 1.778 | | | | 105 | 803 | — |
| 3-1 | X | 1.77B | 122 | 791 | | 130 | 806 | 6314 |
| 3-2 | W | 1.778 | 118 | 778 | | 126 | 796 | 6095 |
| 3-3 | X | 1.778 | 110 | 769 | | 117 | 790 | — |
| 3-4 | W | 1.778 | 102 | 764 | | 114 | 778 | — |
| 3-5 | X | 1.778 | 120 | 786 | | 128 | 801 | — |
| 3-6 | W | 1.778 | 118 | 775 | | 126 | 791 | — |
| 3-7 | X | 1.778 | 108 | 771 | | 116 | 776 | 7999 |
| 3-8 | W | 1.778 | 102 | 756 | | 111 | 764 | — |
| 3-C1 | X | 1.778 | 105 | 790 | | 108 | 797 | — |
| 3-C2 | W | 1.778 | 102 | 789 | | 106 | 791 | — |
| 3-C3 | X | 1.778 | 98 | 800 | | 102 | 807 | — |
| 3-C4 | W | 1.778 | 95 | 789 | | 100 | 799 | — |
| 4-1 | Y | 1.778 | 103 | 742 | 45.4 | 106 | 749 | 8497 |
| 4-2 | Y | 1.778 | 101 | 746 | 45.3 | 105 | 753 | 8081 |
| 4-3 | Y | 1.778 | 105 | 757 | 46 | 107 | 763 | 8337 |
| 4-4 | Y | 1.778 | 103 | 759 | 46.2 | 105 | 763 | 8642 |
| 4-5 | Z | 1.778 | 102 | 736 | 45.4 | 105 | 743 | 8226 |
| 4-6 | Z | 1.778 | 99 | 747 | 45.2 | 103 | 751 | 8758 |
| 4-7 | Z | 1.778 | 99 | 751 | 45.9 | 104 | 759 | |

[1]A = sulphur cured core of Ex. 1
B = polybutadiene peroxide cured core of Ex. 1 and Ex. 3-1, 3-2, 3-5 and 3-6
C = sulphur cured core of Ex. 2
D = sulphur cured core of Ex. 3-3 and 3-4
F = polybutadiene peroxide cured core of Ex. 3-C1 and 3-C2
G = polybutadiene peroxide cured core of Ex. 3-C3 and 3-C4
H = thermoplastic EXACT core of Ex. 4
I = blue core of Ex. 2
J = thermoset EXACT core of Ex. 4
[2]W = lotek 8000/7030 formulation of Ex. 1-3
X = lotek 959/960 formulation of Ex. 2-3
Y = lotek 1002/1003 formulation of Ex. 4
Z = lotek 8000/7010 formulation of Ex. 4

Example 5A

The balls of Examples 3-1, 3-2, 3-7, and 4-1 to 4-6 were spin tested under the following conditions:

Miya Driving Machine
Club: Top Flite Custom 9 iron
Club Head Speed: 105 fps

The results are shown on Table 6 above.

The balls of Examples 3-1, 3-2, 3-7, 4-5 and 4-6 were distance tested and were compared with the 1995 Hot XL golf balls. The distance test conditions are provided below:
Club Name: Top Flite Tour 10.5
Launch Angle—degrees: 9.5
Club Head Speed: 160 ft/sec The distance test results are shown on Table 7.

TABLE 7

| Ball | Traj ° | Flight Time sec | Carry yds | Carry Diff yds | Ctr Dev[1] yds | Roll yds | Total Dist yds | Total Diff yds |
|---|---|---|---|---|---|---|---|---|
| 3-1 | 12.5 | 10.0 | 244.4 | 0.0 | −2.25 | 11.3 | 255.6 | 0.0 |
| 3-7 | 12.8 | 10.0 | 237.7 | −6.6 | −1.75 | 9.4 | 247.1 | −8.5 |
| 3-2 | 12.1 | 10.0 | 227.4 | −17.0 | −3.04 | 19.2 | 246.6 | −9.1 |
| 4-5 | 10.9 | 10.0 | 225.5 | −18.9 | −6.54 | 10.2 | 235.7 | −20.0 |
| 4-6 | 11.3 | 9.9 | 226.8 | −17.5 | −6.71 | 11.7 | 238.5 | −17.1 |
| Hot XL (1995) | 11.7 | 10.0 | 237.8 | −6.6 | −4.75 | 13.1 | 250.9 | −4.8 |

[1]Deviation from center

The longest ball is that of Example 3-1. This result is surprising, particularly in view of the fact that this ball has a COR of 0.806, while the 1995 Hot XL ball has a COR of 0.812±0.003.

The ball of Example 3-2 had a surprisingly long total distance given its low COR of 0.776.

EXAMPLE 5B

Distance tests were conducted for the balls of Examples 3-1, 3-2 and 4-1 to 4-4 under slightly different conditions, which were the following:

Club Name: Top Flite Tour 10.5    Club Head Speed: 155 ft/sec
Launch Angle - degrees: 9.6

The distance test results are shown below on Table 8.

TABLE 8

| Ball | Traj ° | Flight Time sec | Carry yds | Carry Diff yds | Ctr Dev yds | Roll yds | Total Dist yds | Total Diff yds |
|---|---|---|---|---|---|---|---|---|
| 4-1 | 11.5 | 9.9 | 227.1 | −12.2 | 2.08 | 13.1 | 240.2 | −12.9 |
| 4-2 | 11.9 | 10.0 | 226.1 | −13.1 | 1.96 | 13.4 | 239.5 | −13.6 |
| 4-3 | 11.8 | 10.0 | 228.0 | −11.3 | 2.54 | 12.1 | 240.1 | −13.0 |
| 4-4 | 11.8 | 10.0 | 227.4 | −11.9 | 0.63 | 11.1 | 238.5 | −14.6 |
| 3-1 | 12.0 | 10.0 | 239.3 | 0.0 | 2.10 | 13.8 | 253.1 | 0.0 |
| 3-2 | 12.0 | 10.0 | 233.4 | −5.9 | 2.79 | 11.1 | 244.5 | −8.6 |
| Hot XL (1995) | 12.4 | 10.0 | 239.0 | −0.2 | 2.46 | 13.8 | 252.9 | −0.2 |

Once again, the ball of Example 3-1 is the longest. The ball of Example 3-2 again had a surprisingly long total distance given its low COR.

EXAMPLE 6

A number of control golf ball cores having a diameter of 39.2 mm (1.545 inches) and a weight of 36.7 g were formed using Core Formulation K, shown below.

| Core Formulation K | |
|---|---|
| | Parts by Weight |
| Cariflex 1220 | 70 |
| Taktene 220 | 30 |
| Zinc Oxide | 6.7 |
| Zinc diacrylate | 27.4 |
| Zinc Stearate | 18.5 |
| Limestone | 24 |
| Poly Pro 20 Mesh | 8.9 |
| Regrind | 17 |
| Triganox 17/40 | 0.9 |

The cores were cured for 11½ minutes at 320° F., and were then cooled using cooling water for about 7 minutes. The cores had a PGA compression of 95 and a COR of 0.770.

A number of golf ball cores having Core Formulation L (shown below) and diameters of 34.8 mm (1.37 inches) and 39.9 mm (1.57 inches) were formed. The cores were cured for 12 minutes at 320° F., followed by cooling using cooling water for about 6 minutes.

| Core Formulation L | |
|---|---|
| | Parts by Weight |
| Cariflex 1220 | 100 |
| Stearic Acid | 2 |
| Zinc Oxide | 4 |
| Barytes | 52 |
| Hi-Sil 233[1] | 7.5 |
| Vanox 1290[2] | 1 |
| Sulfur | 5.25 |
| Durax[3] | 1.75 |
| DOTG[4] | 1 |
| Bismate[5] | 2.8 |

[1]P.P.G. Industries
[2]R. T. Vanderbilt
[3]R. T. Vanderbilt
[4]R. T. Vanderbilt
[5]R. T. Vanderbilt The cores of control Examples 6-C1, 6-C2 and 6-C3 were covered with a single cover layer having a thickness of 1.78 mm (0.07 inches). The control cores were covered with the cover formulations shown on Table 9, which are the same as cover formulations W-Z in Examples 1-4. The cores of Examples 6-1 through 6-10 were covered with inner and outer covers having the cover formulations and thicknesses shown on Table 9. All of the ball of the invention and the control balls were distance tested using a 5-iron at 128 feet per second and a driver at 160 feet per second.

As shown on Table 9, while the balls of the invention had substantially lower coefficients of restitution than the control balls, their distance was only slightly shorter. Thus, the golf balls of the invention provide a greater distance per point of COR as compared to the control balls.

TABLE 9

| | | +Inner Cover | | | | | +Outer Cover | | | | | 5 Iron @ 128 fps | | Driver @ 160 fps | |
|---|---|---|---|---|---|---|---|---|---|---|---|---|---|---|---|
| Ex. # | Core Type | Material | Dia. mm | Thickness mm | Wgt. g | PGA Comp | COR × 1000 | Material | Thickness mm | Wgt. g | PGA Comp | COR × 1000 | Carry yds | Total yds | Carry yds | Total yds |
| 6-C1 | K | N.A. | N.A. | N.A. | N.A. | N.A. | N.A. | Z | 1.78 | 45.4 | 104 | 792 | 170.1 | 172.1 | 249.5 | 256.6 |
| 6-1 | L | W | 39.2 | 3.50 | 35.8 | 70 | 742 | Z | 1.78 | 44.6 | 105 | 764 | 167.6 | 170.8 | 242.8 | 248.3 |
| 6-2 | L | Y | 39.2 | 3.50 | 35.8 | 74 | 744 | Z | 1.78 | 44.8 | 108 | 759 | 166.4 | 168.4 | 241.8 | 246.4 |
| 6-3 | L | X | 39.2 | 3.50 | 36.3 | 88 | 766 | Z | 1.78 | 45 | 114 | 771 | Not Tested | | Not Tested | |
| 6-4 | L | W | 39.9 | 3.81 | 37.1 | 77 | 748 | Y | 1.40 | 45 | 107 | 766 | 164.5 | 167.2 | 242.6 | 247.8 |
| 6-5 | L | Y | 39.9 | 3.81 | 37.2 | 82 | 756 | Y | 1.40 | 45 | 109 | 765 | 165.5 | 169.6 | 243.1 | 247.9 |
| 6-6 | L | W | 39.2 | 3.50 | 35.8 | 70 | 742 | Y | 1.78 | 44.9 | 107 | 757 | 166.5 | 167.4 | 243.3 | 247.3 |
| 6-C2 | K | N.A. | N.A. | N.A. | N.A. | N.A. | N.A. | Y | 1.78 | 45.7 | 106 | 804 | 167.5 | 171.2 | 251 | 256.7 |
| 6-C3 | K | N.A. | N.A. | N.A. | N.A. | N.A. | N.A. | X | 1.78 | 45.8 | 109 | 807 | 168.5 | 174.4 | 252.2 | 257.4 |
| 6-7 | L | Y | 39.2 | 3.50 | 35.8 | 78 | 744 | X | 1.78 | 45.2 | 111 | 779 | 169.5 | 171.9 | 245.7 | 250.1 |
| 6-8 | L | X | 39.2 | 3.50 | 36.3 | 88 | 766 | X | 1.78 | 45.4 | 116 | 783 | 170.5 | 170.8 | 244.6 | 249.7 |
| 6-9 | L | W | 39.9 | 3.81 | 37.1 | 77 | 748 | X | 1.40 | 45.3 | 112 | 772 | 171.5 | 171.4 | 242.5 | 248.1 |
| 6-10 | L | X | 39.9 | 3.81 | 37.5 | 92 | 768 | X | 1.40 | 45.2 | 118 | 774 | 172.5 | 172.7 | 245.6 | 250.3 |

What is claimed is:

1. A golf ball comprising:
a core having a coefficient of restitution of at least 0.650, and a cover, said cover comprising an inner cover layer and an outer cover lager wherein said inner cover layer and said outer cover layer have a combined thickness of at least 3.6 mm (0.142 inches) and each of the inner cover layer and outer cover layers has a Shore D hardness of at least 60.

2. A golf ball according to claim 1, wherein the core has a PGA compression of about 85 or less and the difference between the coefficient of restitution of the ball and the coefficient of restitution of the core is at least 0.025.

3. A golf ball according to claim 1, wherein the ball has a diameter of at least about 42.7 mm (1.68 inches).

4. A golf ball according to claim 1, wherein the ball has a diameter of at least about 43.2 mm (1.70 inches).

5. A golf ball according to claim 3, wherein the difference between the coefficient of restitution of the core and the coefficient of restitution of the ball is at least 0.025.

6. A golf ball according to claim 3, wherein the difference between the coefficient of restitution of the core and the coefficient of restitution of the ball is at least 0.035.

7. A golf ball according to claim 3, wherein the difference between the coefficient of restitution of the core and the coefficient of restitution of the ball is at least 0.045.

8. A golf ball according to claim 1, wherein the inner and outer cover layers have substantially the same Shore D hardness.

9. A golf ball according to claim 1, wherein the difference between the Shore D hardness of the inner cover layer and the Shore D hardness of the outer cover layer is no more than 5.

10. A golf ball according to claim 1, wherein the difference between the Shore D hardness of the inner cover layer and the Shore D hardness of the outer cover layer is no more than 2.

11. A golf ball according to claim 1, wherein the core has a PGA compression of 85 or less.

12. A golf ball according to claim 1, wherein the core has a COR of at least 0.700.

13. A golf ball according to claim 1, wherein the cover has a thickness of at least 4.0 mm (0.157 inches).

14. A golf ball according to claim 1, wherein the cover has a thickness of at least 4.5 mm (0.177 inches).

15. A golf ball according to claim 1, wherein the core comprises at least one member selected from the group consisting of natural rubber and polybutadiene.

16. A golf ball according to claim 1, wherein the core comprises a metallocene catalyzed polyolefin.

17. A golf ball according to claim 1, wherein the cover comprises an ionomer.

18. A golf ball according to claim 1, wherein the core is sulfur cured.

19. A golf ball according to claim 1 wherein the core comprises a blend of polybutadienes.

20. A golf ball according to claim 19 wherein at least one of the polybutadienes in the blend is a cis-1,4-polybutadiene.

21. A golf ball according to claim 19 wherein at least one of the polybutadienes in the blend has a weight average molecular weight of from about 100,000 to about 500,000.

22. A golf ball according to claim 26 wherein the cis-1,4-polybutadiene has a weight average molecular weight of from about 100,000 to about 500,000.

23. A golf ball according to claim 19 wherein each polybutadiene in the blend is a cis-1,4-polybutadiene.

24. A golf ball according to claim 23 wherein each cis-1,4-polybutadiene has a weight average molecular weight of from about 100,000 to about 500,000.

25. A golf ball according to claim 19 wherein the core is peroxide cured.

26. A golf ball according to claim 1 wherein the inner cover, the outer cover layer, or both is comprised of at least one ionomer resin.

27. A golf ball according to claim 26 wherein the ionomer resin is an ionic copolymer which is a metal salt of the reaction product of an olefin having from about 2 to 8 carbon atoms and an unsaturated monocarboxylic acid having from about 3 to 8 carbon atoms.

28. A golf ball according to claim 27 wherein the metal salt is selected from sodium, zinc, magnesium and lithium.

29. A golf ball according to claim 27 wherein the ionomer resin is in the inner cover layer.

30. A golf ball according to claim 27 wherein the ionomer resin is in the outer cover layer.

31. A golf ball according to claim 27 wherein the ionomer resin is in both the inner cover layer and the outer cover layer.

32. A golf ball according to claim 26 wherein the ionomer resin is a blend of ionomer resins.

33. A golf ball according to claim 27 wherein the ionomer resin ionic copolymer is from about 10–100% neutralized by the metal.

34. A golf ball according to claim 27 wherein the ionomer resin ionic copolymer has greater than about 16% by weight carboxylic acid.

35. A golf ball according to claim 27 wherein the ionomer resin ionic copolymer has from about 17% to about 25% by weight of carboxylic acid.

36. A golf ball according to claim 27 wherein the ionomer resin ionic copolymer has from about 18.5% to about 21.5% by weight of carboxylic acid.

37. A golf ball according to claim 34 wherein the ionomer resin is in the inner cover layer.

38. A golf ball according to claim 34 wherein the ionomer resin is in the outer cover layer.

39. A golf ball according to claim 34 wherein the ionomer resin in both the inner cover layer and the outer cover layer.

* * * * *

UNITED STATES PATENT AND TRADEMARK OFFICE
CERTIFICATE OF CORRECTION

PATENT NO. : 6,309,314 B1  
DATED : October 30, 2001  
INVENTOR(S) : Michael J. Sullivan and Mark L. Binette Page 1 of 1

It is certified that error appears in the above-identified patent and that said Letters Patent is hereby corrected as shown below:

<u>Title page,</u>
Item [63], "Continuation of application No. 08/743,579, filed on Nov. 4, 1996, now Pat. No. 5,883,553" should read -- Continuation of application No. 08/743,579, filed on Nov. 4, 1996, now Pat. No. 5,833,553 --.

Signed and Sealed this

Ninth Day of April, 2002

Attest:

JAMES E. ROGAN
*Attesting Officer*   *Director of the United States Patent and Trademark Office*